Dec. 18, 1934.  W. F. KASPER  1,984,746
RAILROAD VEHICLE
Filed Nov. 25, 1932   2 Sheets-Sheet 1
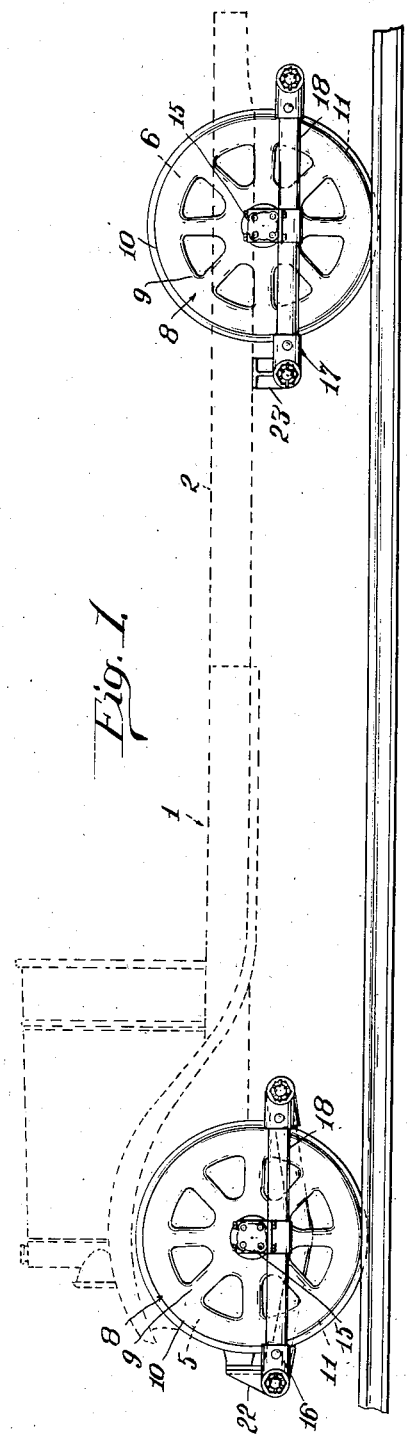
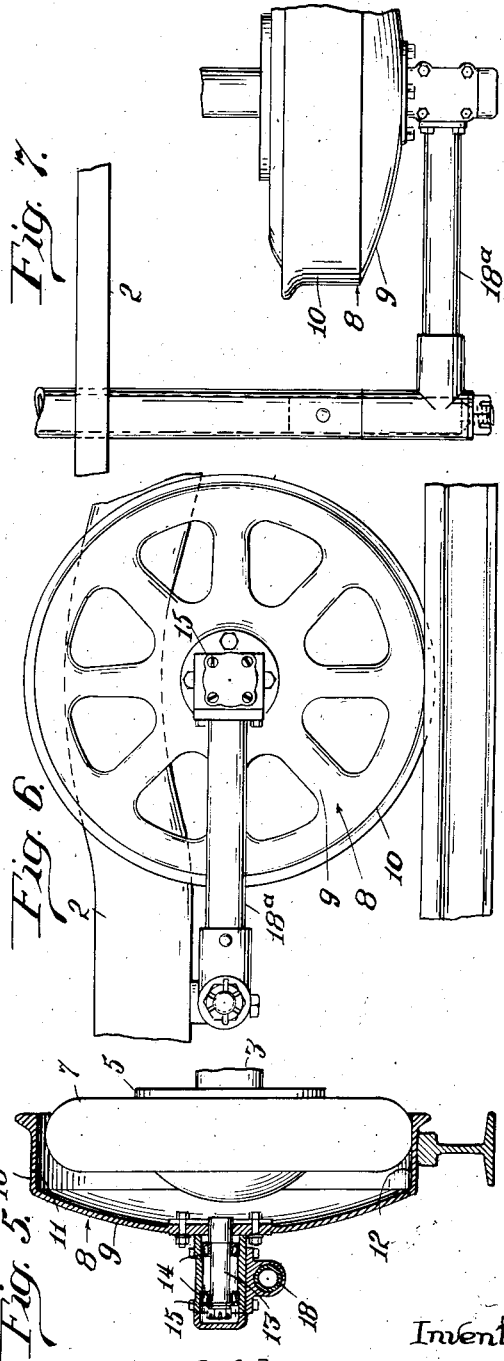
Inventor
Walter F. Kasper
By
Arthur W. Nelson
Attorney Dec. 18, 1934.     W. F. KASPER     1,984,746
RAILROAD VEHICLE
Filed Nov. 25, 1932     2 Sheets-Sheet 2
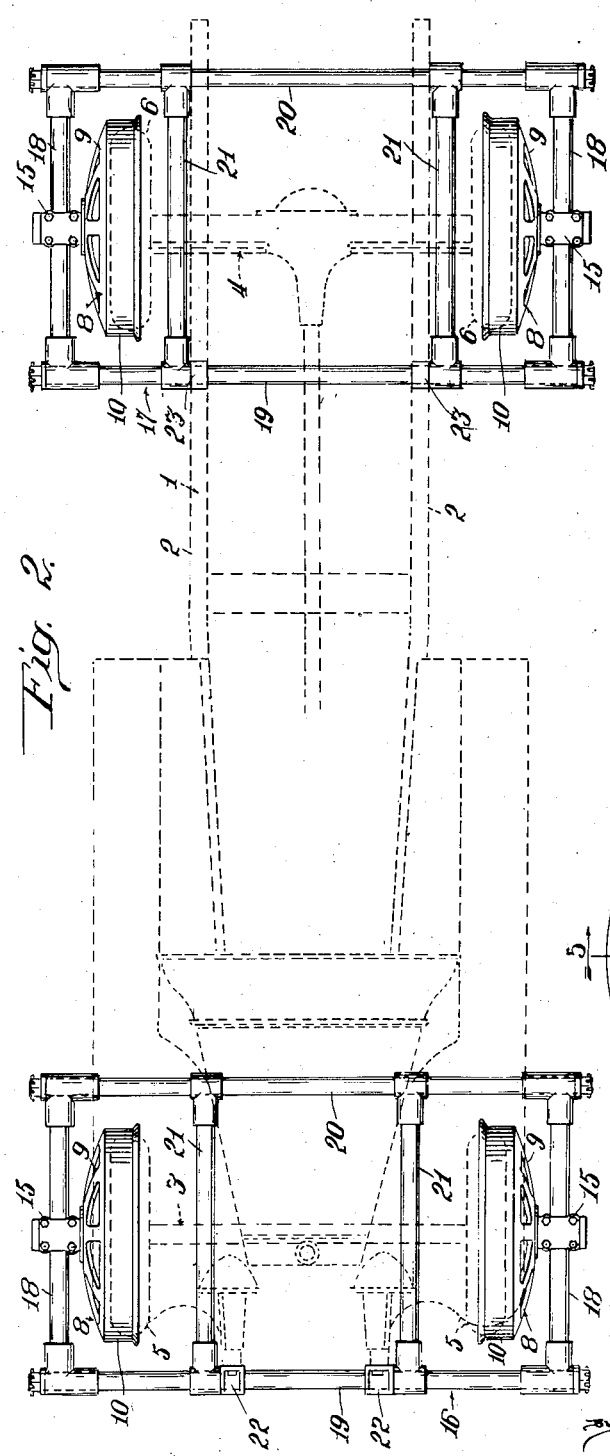
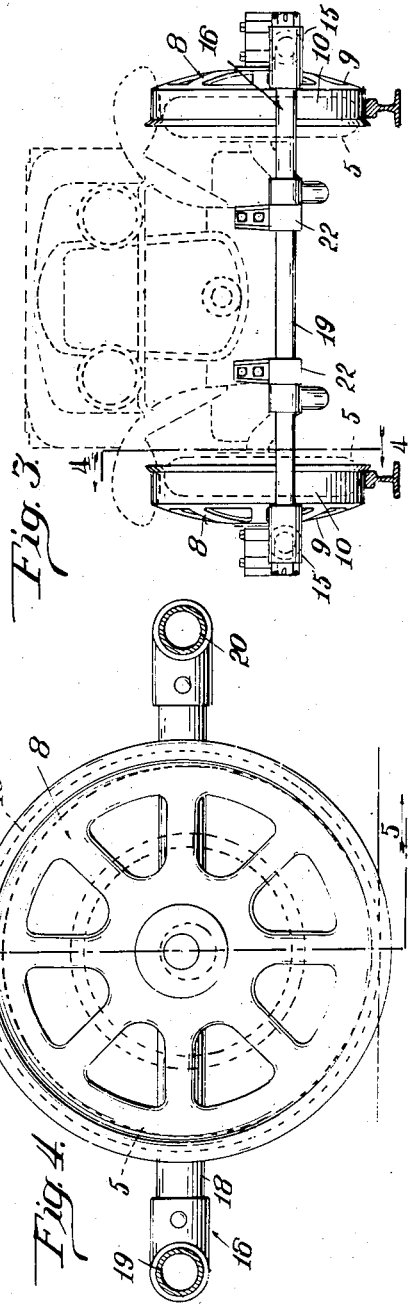
Inventor
Walter F. Kasper
Attorney Patented Dec. 18, 1934

1,984,746

UNITED STATES PATENT OFFICE 1,984,746

RAILROAD VEHICLE

Walter F. Kasper, Fairmont, Minn., assignor, by mesne assignments, to Austro-Daimler-Puchwerke A. G., Wiener-Neustadt, Austria Application November 25, 1932, Serial No. 644,258

11 Claims. (Cl. 295—3)

This invention relates to improvements in railroad vehicles and it consists of the matters hereinafter described and more particularly pointed out in the appended claims.

Many expedients have been devised in the attempt to adapt a rubber tired highway vehicle for use on the rails of a railroad. Steel wheels having suitable rail engaging treads have been substituted for the rubber tired wheels. Such a substitution is not practical or satisfactory for a number of reasons. Amongst these may be noted the fact that such steel wheels increase the stresses in the vehicle axle parts to a point where the life thereof is greatly reduced under the loads for which the vehicle was normally designed to operate when using rubber tires.

To overcome the above mentioned disadvantage, and to secure the safety factor in axle parts, the loads carried by the vehicle must be reduced to such a point as to make the vehicle of little practical value or use from the standpoint of transporting passengers and freight.

Again, various applications of pneumatic tires, made especially for rolling directly on the rails have been devised. Such arrangements, however, have the serious defect of lessened capacity because the tread surface of the rails is so narrow as to reduce the contact between rails and tires. Thus when the tires are used to run directly on the rails, this reduction of contact is such that the normal capacity of the tires, (as used in highway service) is greatly impaired.

If this objection be sought to be overcome by increasing the air pressure in tires running directly on the rails, then their resiliency is greatly reduced and one of the prime advantages of pneumatic tires is lost. Furthermore, other features when added thereto, such as safety rings and rubber insulated flanges, (which are necessary to the use of such tires on rails,) so increase the cost thereof that said increased cost and limited load capacity naturally make such arrangements impractical.

Another serious disadvantage in the use of a rubber tire rolling directly on rails, resides in the fact that the co-efficient of friction of rubber tires on rails when wet is greatly reduced in comparison with the co-efficient of friction of tires on rails when dry. Hence the braking efficiency of a vehicle equipped with rubber tires and rolling directly on wet rails is practically negligible as compared to ordinary braking efficiency. This is mainly due to the reduced contact and to the lubrication afforded by water and slime which naturally accumulate on rails in wet weather.

One of the objects of the present invention is to provide means making possible the use of rubber tired vehicles on a railroad track and which means shall overcome the disadvantages mentioned with respect to substituted steel wheels and those provided with rubber tires made especially to roll directly on said rails.

Another object of the invention is to provide means of this kind by which the normal and intended load capacity of the vehicle when running on rails, may be retained and even increased and at the same time secure the same factor of safety and the same period of usefulness without the necessity of changing the wheels of the vehicle as used for highway service.

A further object of the invention is to provide a means by which a vehicle originally intended for highway service may be used for rail service, and which means shall be simple in construction and efficient in operation for its intended purpose.

The above mentioned objects of the invention, as well as others, together with the many advantages thereof, will more fully appear as the specification proceeds.

In the drawings:

Fig. 1 is a view in side elevation of a rubber tired vehicle embodying my invention and adapted to travel upon the rails of a railroad track.

Fig. 2 is a top plan view of the same.

Fig. 3 is a view in front elevation of the same.

Fig. 4 is a vertical detail sectional view in an enlarged scale as taken on the line 4—4 of Fig. 3.

Fig. 5 is another detail vertical sectional view through a part of the vehicle as taken on the line 5—5 of Fig. 4.

Fig. 6 is a fragmentary detail view in side elevation of a slightly modified form of the invention.

Fig. 7 is a top plan view of the modified form of the invention, shown in Fig. 6.

In general, my invention contemplates the provision of means in the form of steel tired wheels having a standard car wheel tread for engagement upon conventional rails and each of which wheels is provided with a relatively wide internal, annular track portion upon which the peripheral tread of a rubber tired wheel has an inside rolling bearing engagement.

Referring now in detail to that embodiment of the invention, illustrated in the accompanying drawings, 1 indicates as a whole a motor vehicle, the chassis frame 2 of which is provided with the usual spring hung front and rear axles 3 and 4 respectively. Associated with said axles are pairs of front and rear wheels 5 and 6 respectively, each of which is provided with a rubber tire 7 preferably of the conventional pneumatic type.

Associated with each rubber tired wheel is a wheel 8 having a body portion 9 and a flanged metallic tire or rim 10. Said tire or rim has an external peripheral rail engaging tread surface 11 and a concentric, internal annular surface or track portion 12 respectively.

Said track 12 is preferably of a diameter somewhat greater than that of the tire of the wheel associated therewith as is best shown in Figs. 4 and 5.

Preferably the body 9 of each wheel 8 is convexed outwardly but as substantially the only weight carried by the said wheel is carried through its tire or rim, said body can be of relatively light construction. Such a body may be made integral with its tire or rim or it may be made separate therefrom and attached thereto in any suitable manner.

The body 9 of each wheel 8 is provided with an outwardly extending, axial stud or shaft 13 which is journalled as by spaced antifriction bearings 14 in a bearing box 15 as best shown in Fig. 5. The wheels 8 associated as a pair with the pairs of front and rear wheels 5 and 6 respectively of the vehicle, are operatively connected together in proper gauge by means of front and rear frames 16 and 17 respectively.

Each of said frames comprises, longitudinally extending side bars 18—18 which are connected together at their ends by front and rear cross bars 19 and 20 respectively, and preferably said side bars have a pivotal connection with the front cross bars. Said cross bars are further connected together by longitudinal bars 21—21 which are "dropped" or bent downwardly at the middle to pass under the respective axles 3 or 4.

The bearing box 15 for each wheel 8 is secured to an associated side bar 18 at a point between its ends in any suitable manner. The front bar 19 for the front frame, is mounted at points between its ends in brackets 22 which in turn are fixed to the front ends of the side members of the chassis frame 2. The front bar for the rear frame is mounted in a similar manner in brackets 23 depending from said side members of the chassis frame. By means of the structure described, the frames 16 and 17 are held against lateral shifting with respect to the vehicle frame but the rear end of each frame can float to accommodate the yielding action between the vehicle wheels 5—6 and chassis frame due to the conventional spring mounting between them and due to the yielding resilient action of the pneumatic tires.

When the vehicle is motor driven, the driving wheels are caused to roll upon the track portion 12 with a substantially epicycloidal action and thus cause the vehicle to progress along the rails, the undriven wheels of the vehicle operating in a similar manner. This operation is the same whether the vehicle is being propelled forwardly or rearwardly.

It is pointed out that as the surface 12 of each wheel 8 forms a continuous wide track for the rubber tire of the associated wheel 5—6 to roll upon, said tires retain their full load capacity and at the same time give a steel contact with the rail thus maintaining a thoroughly workable co-efficient of friction for driving and braking purposes. As this track portion 12 is of a diameter only slightly greater than the outside diameter of the associated pneumatic tire, the area of contact of said pneumatic tire with said steel tire or rim is considerably greater than the area of contact that said rubber tire would have with a highway. Thus the load carried by the vehicle is distributed over a much larger area of each tire and its carrying capacity is greatly increased. Again, if each tire carries the same load weight that it would carry on a highway, the life of such a tire would be greatly increased. With such advantages inherent in a construction of the kind described, lighter tires which cost less could be used with a proportionate saving.

The enlarged contact area thus afforded for the pneumatic tire insures a good grip for driving torque and braking efficiency. Should the pneumatic tire be deflated, the wheels 8 will remain in position with respect to the track so that derailing of the vehicle would be prevented.

The load of the vehicle is carried in substantially the same manner as when the vehicle is in highway service, the interposed steel tires merely acting as a broad steel surface upon which rubber pneumatic tired wheels may roll.

It is not necessary that the rail engaging wheels and the associated frame mechanisms be of unduly heavy construction because the vehicle load is carried by its rubber pneumatic tires directly on the inner face of the tires or rims 10 and thence directly through the same to the rails. Hence, no substantial load or weight is imposed upon the bearings of said rail engaging wheels so that they and the associated part can be of light weight construction.

With the demands made upon railroads for higher speeds in transporting perishable goods, a serious problem has arisen because of the damage occurring to lading on long fast runs due to jars, jolts and excessive vibration. This is apparent because the ordinary freight or refrigerator car trucks do not afford that smooth riding quality necessary for the transportation of such perishable and breakable goods. The arrangement described herein, eliminates such severe jolts and jars as are occasioned by running at high speeds, on steel wheels. Furthermore, it is not necessary to use expensive light weight vehicle construction, in order to obtain the desired results.

In Figs. 6 and 7, I have shown a slightly modified form of the invention in that instead of using a rectangular frame for each pair of wheels, an arm 18a pivoted at one end to the chassis frame, is employed for each wheel, the connection for the pivoted end of each arm being such as to hold the wheel to gauge.

The rail engaging wheels may be operatively connected to the vehicle in other ways than those described but it is essential that the arms or frames and the bearings carried thereby maintain the rail engaging wheels 8 to gauge and also maintain the intended or desired rolling relation between said rail engaging wheels and the rubber pneumatic tired wheels of the vehicle.

So also the wheel arrangement described permits the construction of four-wheel and six-wheel railroad trucks, which if applied under the ordinary or light weight box car or refrigerator car will give satisfactory results.

While in describing the invention, I have referred in detail to the form, arrangement and construction of the various parts thereof, the same is to be considered merely as illustrative so that I do not wish to be limited thereto except as may be specifically set forth in the appended claims.

I claim as my invention:

1. In combination, a vehicle including a frame, front and rear axles, wheels on said axles, a resilient tire on each of said wheels, other wheels associated each with one of said first mentioned wheels and each having a rail engaging tread and an internal annular track open toward the other and within which the tire of the associated first mentioned wheel has a rolling engagement, and means between said other wheels and frame for operatively connecting them together, so that said other wheels are maintained to gauge and move with the vehicle, said means having a pivotal connection with the frame in a direction transversely thereof and connected to the outer face of the rail engaging wheels.

2. In combination, a vehicle including a frame, front and rear axles, wheels on said axles, a resilient tire on each of said wheels, other wheels associated each with one of said first mentioned wheels and each having a rail engaging tread and an internal annular track in its inner side upon which the tire of the associated first mentioned wheel has a rolling engagement, a member spaced laterally from each side of the frame and connected thereto for a pivotal movement about an axis transversely of said frame, and means providing a rotative bearing for each of said other wheels with respect to its associated member.

3. In combination, a vehicle having a frame, a rubber tired wheel operatively connected thereto, a second wheel having a rail engaging tread and formed to provide an internal annular track facing inwardly and in which the said rubber tired wheel has rolling engagement, a member operatively connected to said frame and arranged outside of said other wheel, and means for rotatably mounting said other wheel with respect to said member.

4. In combination, a vehicle having a frame, a rubber tired wheel operatively connected thereto, a second wheel having a rail engaging tread and formed to provide an internal annular track in its inner side and within which said rubber tired wheel has rolling engagement, a member pivotally connected to said frame and arranged outside of said other wheel, an axle stud carried by said other wheel, and a bearing box carried by said member and in which said stud is journalled.

5. Means for adapting a pneumatic tired vehicle to run on rails comprising a frame adapted to be attached to the end of a chassis of the vehicle and having front and rear cross bars to extend in front and rear of a pair of pneumatic tires and connecting side bars, flanged wheels carried by said side bars with their axis normally slightly above the axis of the pneumatic tired wheels, said flanged wheels having interior running surfaces for the pneumatic tired wheels and means for connecting one of said frame bars to the chassis of the vehicle and leaving the other bars free and permitting the chassis to vibrate independently of the flanged track wheels and vice versa.

6. Means for adapting a pneumatic tired vehicle to run on rails comprising a frame having front and rear cross bars and connecting side bars, flanged wheels carried by said side bars with their axis normally slightly above the axis of the pneumatic tired wheels, said flanged wheels having interior running surfaces for the pneumatic tired wheels and means for hinging said frame to the chassis of the vehicle and permitting the chassis to vibrate independently of the flanged track wheels and vice versa.

7. Means for converting a pneumatic tired road vehicle into a track running vehicle comprising a frame adapted to be secured to the chassis and including pivoted side bars outside of the pneumatic tires and a flanged track wheel secured to each side bar and having a running surface in its inner face for supporting the adjacent pneumatic tire.

8. Means for converting a pneumatic tired road vehicle into a track running vehicle comprising a frame adapted to be secured to the chassis and including pivoted side bars outside of the pneumatic tires, a flanged track wheel secured to each side bar and having a running surface in its inner face for supporting the adjacent pneumatic tire and a cross bar connecting the side bars beneath the chassis.

9. Means for converting a pneumatic tired road vehicle into a track running vehicle comprising arms hinged to the chassis to swing outside of the usual pneumatic tires and flanged track wheels carried by said arms and provided with drums facing inwardly and applied to the tires from outside and in which the pneumatic tires run and normally support the load.

10. Running gear comprising a conventional vehicle chassis with pneumatic tires and spring supported chassis, brackets depending from the chassis, side bars pivoted to the brackets and swinging outside of the pneumatic tires and flanged track engaging wheels having stub axles carried by said side bars, said wheels having drums open inwardly and applied to the pneumatic tires from the outside of the vehicle.

11. Running gear comprising a chassis having pneumatic tires, a frame attachable to the chassis from below and having flanged track wheels with open drums facing inwardly in which the pneumatic tires run, said frame having a cross bar extending beneath the chassis.

WALTER F. KASPER.